US00RE42113E

(19) United States
(12) Reissued Patent
Maiocchi et al.

(10) Patent Number: US RE42,113 E
(45) Date of Reissued Patent: Feb. 8, 2011

(54) CONTROL SYSTEM OF MOTORS FOR ROTATING A DISK AND FOR POSITIONING HEADS OF A MASS STORAGE DISK DEVICE

(75) Inventors: Giuseppe Maiocchi, Capiago Intimiano (IT); Michele Boscolo, Chioggia (IT); Roberto Bardelli, Fino Mornasco (IT)

(73) Assignee: STMicroelectronics S.r.l., Agrate (Brianza) (IT)

(21) Appl. No.: 12/708,169
(22) Filed: Feb. 18, 2010

Related U.S. Patent Documents

Reissue of:
(64) Patent No.: 7,332,886
Issued: Feb. 19, 2008
Appl. No.: 11/462,548
Filed: Aug. 4, 2006

(30) Foreign Application Priority Data

Aug. 5, 2005 (IT) ..... VA2005A000051

(51) Int. Cl.
*G05B 11/28* (2006.01)

(52) U.S. Cl. ..... 318/599; 318/600; 318/811; 388/804

(58) Field of Classification Search ..... 318/599, 318/600, 811; 388/804
See application file for complete search history.

(56) References Cited

U.S. PATENT DOCUMENTS

| | | | | |
|---|---|---|---|---|
| 5,760,563 | A | 6/1998 | Bennett et al. | 318/641 |
| 6,730,610 | B1 | 5/2004 | Sun et al. | 438/706 |
| 2005/0194453 | A1 | 9/2005 | Conner et al. | 235/492 |

*Primary Examiner*—Walter Benson
*Assistant Examiner*—Erick Glass
(74) *Attorney, Agent, or Firm*—Lisa K. Jorgenson; Christopher F. Regan

(57) ABSTRACT

An integrated control and power driving system moves a read/write head carrying arm over the surface of a disk. The integrated control and power driving system is applicable to a spindle motor, a mass storage disk drive and a voice-coil motor, for example, and includes a first chip and a second chip. The first chip integrates the output power stages driving the motors, and has an interface for outputting feedback signals representing functioning conditions of the voice-coil motor and of the spindle motor, and for receiving digital control signals of the output power stages. The second chip integrates logic drive and control circuitries of the power stages and an interface for receiving the feedback signals output by the first chip, and for transmitting to the first chip the digital control signals.

25 Claims, 4 Drawing Sheets

CONTROL SYSTEM OF MOTORS FOR ROTATING A DISK AND FOR POSITIONING HEADS OF A MASS STORAGE DISK DEVICE

Matter enclosed in heavy brackets [ ] appears in the original patent but forms no part of this reissue specification; matter printed in italics indicates the additions made by reissue.

FIELD OF THE INVENTION

The invention relates in general to mass storage disk devices, such as common hard disk drives (HDD) for example, and more particularly, to a silicon integrated control system for a spindle motor that rotates a disk and for a motor that positions an arm that carries read/write heads.

BACKGROUND OF THE INVENTION

Voice coil motors (VCM) are commonly used for moving an arm that carries read/write heads over a spinning disk from a rest position on a parking ramp to a desired position, and vice-versa. Commonly, the disk is rotated by a brushless spindle motor such to position the heads over the tracks of a certain sector of the disk from which data is to be read or written.

Voice-coil motors are used in a number of applications. They are substantially composed of a winding immersed in a magnetic field generated by a permanent magnet. By forcing a certain current through the winding, the winding receives a displacing force. The displacement of the winding may be controlled with great precision.

In a disk storage device, it is important to control with high precision both the brushless spindle motor and the VCM. Modern fabrication technologies permit fabrication of integrated devices containing in a single package the power switches (bipolar junction or MOS transistors) of the output drivers of the brushless motor, and of the VCM for positioning the heads together with the control circuitries of both motors.

With these technologies allowing fabrication in a single chip through a single process logic CMOS devices, bipolar junction signal transistors, vertical or lateral power MOS or BJT devices, it has been possible to digitally implement many control functions. By using powerful CAD tools it has been possible to implement rather complex functions and controls of extremely high precision and performances in these integrated devices, commonly known as "power combo".

Co-integrated control architectures based exclusively on digital techniques and circuits and output power stages make these devices adaptable to the user needs, and to different schemes of partitioning of the mass storage support.

The circuit for driving the brushless spindle motor for rotating the disk is generally composed of fully digital circuit blocks. Improvements toward a complete digitalization also of the control circuit of the VCM have been achieved, and they are leading to the realization of a control architecture of the VCM motor called "digital power processing voltage mode" or DPPV.

For example, FIGS. 1 and 2 depict respective integrated control systems of a brushless motor and of a VCM for positioning the heads on the rotating disk according to a modern embodiment on a single chip of a power combo device intended for a hard disk device (HDD).

The function of the different circuit blocks and of the main signals of the two control systems, used in various commercial devices of STMicroelectronics, depicted in FIGS. 1 and 2, are illustrated in TABLES 1 and 2:

TABLE 1

| | |
|---|---|
| Self Adapt. T.O. | Circuit for rephrasing automatically the current in the spindle with its BEMF in order to optimize the motor torque. |
| Curr. Sign | Circuit for determining the direction of the flow of the current in the spindle. |
| ADC | Analog-to-digital converter of the supply voltage and of other main voltages. |
| Phase Shift | Enables the rephasing of the current of the spindle and of the relative BEMF upon a user input or upon a signal coming from the Self Adapt T.O. |
| Feed-Fwd | Circuit for feed-forward compensating differences between the supply voltage and the nominal value. |
| Address generator | It generates the address of the data stored in "Memory 2 × 3 profile" corresponding to the instantaneous values of the voltage to be given to the phases of the spindle for generating an appropriate voltage waveform. |
| Memory 2 by 3 profile | Look up table that stores the data sequences that generate an appropriate voltage waveform (called 2 × 3) to be supplied to the phases of the spindle during its rotation. |
| Digital multiplier | A digital multiplier that allows modulation of the amplitude of each phase voltage of the spindle as a function of the value coming from the speed controller for allowing the control of the speed. |
| PWM Converter | In case of three-phase motors, it converts three digital data with N bits in three phase modulated digital data (PSM). |
| SPINDLE PSM POWER | Power stage for driving (in switched mode) the brushless motor. |
| Spindle Register Map | Bank of registers for controlling the various functions of the spindle. |
| Window | Determines the duration in electrical degrees of the period between two consecutive zero-crosses of the BEMF in one or more phases of the spindle. |
| Mask PWM | Masks by an appropriate duration each switching or the PSM signals generated by the block PWM converter. |
| Mask Win. | Masks by an appropriate duration in degrees each time a tristate condition is forced for reading correctly the BEMF. |
| BEMF | Back electromotive force induced in the windings of the brushless motor. |
| Frequency multiplier | Frequency multiplier. |
| ZC filter | Filter for eliminating spurious switching of a zero-cross signal ZC generated at each zero-cross of the BEMF. |
| ZC comp. + ZC masking | In this block the zero-cross signal is generated and all the maskings forced by the signals Mask Win and Mask PWM and by the current limiter are enabled. |
| Curr Lim | Current limiter |
| Ind S. | Block for measuring inductances of the three phases of the used spindle, in the start-up phase, for identifying the position of the rotor. |
| Async comm. | This signal is completely asynchronous with the other signals of the system. |
| Embedded startup | Integrated automatic start-up of the spindle. |
| DMUX | Block for selecting the output signals of the blocks inductive sense and ZC filter. |
| Spindle | Brushless motor that rotates the disk. |

TABLE 2

| | |
|---|---|
| F-Fwd ADC | Analog-to-digital converter of the supply voltage level. |
| R var. Compensat. | Circuit for compensating variations of resistance of the winding of the VCM in respect to the nominal value. |
| POR Retract | Circuit that displaces the VCM in the rest position when a Power on Reset is asserted. |
| VCM Register Map | Bank of registers for controlling the various functions of the VCM. |
| IIR | Infinite impulse response filter. |
| Pwr Supply Feed-Fwd | Circuit for feed-forward compensating supply voltage shifts from the nominal value. |

TABLE 2-continued

| | |
|---|---|
| Hi Perform PSM conv. | Converts an N bit digital datum in two phase-shift modulated (PSM) signals for driving the VCM. |
| VCM PSM POWER | Power stage for driving the VCM. |
| BEMF Compensat. | Circuit for compensating the back electromotive force induced in the winding of the VCM. |
| Discont. Ramp Load. | Charges/discharges the VCM on/from the parking ramp with temporaneous interruption of the current for reading the BEMF. |
| ADC | Analog-to-digital converter. |

In the depicted example, the driving circuit of the VCM is realized according to a digital voltage mode. This requires dedicated additional control blocks for compensating unavoidable variations of the three main variables that, in this case, are not controlled, as it happens with a current feedback loop, namely: the back electromotive force induced in the winding, the supply voltage, and the resistance in the winding of the motor.

Obviously, if the control architecture of the VCM is based on a more traditional current control loop, the circuit blocks of FIG. 2, called R var. Compensat., IIR, BEMF Compensat., PWR Supply FF and F-FWD ADC would be substituted in their function by a normal feedback current control circuit (current mode driving).

These integrated devices are known as a power combo, despite the efforts for implementing control functions, safety functions for ensuring the integrity of the power stages and any other possible function in a digital mode. They require the presence of other analog circuits besides the integrated structures of the output power devices.

Constantly improved fabrication technologies for reaching larger and larger scales of integration, especially for digital circuits, have allowed a reduction in the size of devices and in their footprint. These are important factors for the manufacturers of mass storage disk devices.

Despite the new possibilities of greater compactness of the control digital circuitry offered by the new fabrication technologies, these extreme process technologies do not allow the fabrication of power devices and of related analog driving circuits of utmost performance in terms of power consumption. Further reductions of the size must be combined with the need of preserving acceptable performances of the power stages and of the related driving circuits.

SUMMARY OF THE INVENTION

For the same performances, significantly reduced silicon area occupancy may be achieved by realizing a complete system for controlling and driving the rotation brushless spindle motor and the VCM of the read/write heads of a disk mass storage device, instead of on a single chip of silicon, as has long become a standard with modern fabrication processes. Instead, two distinct chips of silicon are assembled in a single package.

There is a relocation of the various functional blocks of the whole power combo system, or more precisely, of the two distinct control systems of the respective motors (i.e., the brushless spindle motor and VCM) for positioning the heads carrying arm. This even accounts for the need of realizing appropriate interfaces for exchanging electrical signals between the two distinct chips, and concentrates on the chip that stores the main control circuitries. This is practically the whole logic circuitry. On the second chip is formed the power devices and the relative driving circuitry as well as the circuits for detecting parameters and signals to be used by the logic control circuitry. This results in a reduction of the required silicon area, and obtains an enhanced performance of the power stages without requiring a significant increase of silicon area.

In the studied prototype, for fabricating the digital control chip, it has been possible to use a 0.13 μm row definition technology, that is much more compact than the present BCD (bipolar-CMOS-DMOS) technology at 0.35 μm currently used for fabricating Smart Power™ devices of acceptable power efficiency, achieving a significant saving of the total silicon area requirement without sacrificing the performances of the power stages that were realized in BCD technology at 0.35 μm, as in the commonly used BCD technique.

The net silicon area saving and the consequent reduction of fabrication costs of these devices is substantially optimized by grouping in one and in the other chip the circuitries of the various functional blocks of the two control systems, such to allow the maximum silicon area saving, having accounted for the area required by the additional interfaces required in the two distinct integrated circuits for exchanging signals.

BRIEF DESCRIPTION OF THE DRAWINGS

The invention is described in detail referring to the attached drawings, wherein.

DETAILED DESCRIPTION OF THE PREFERRED EMBODIMENTS

Figure 1:
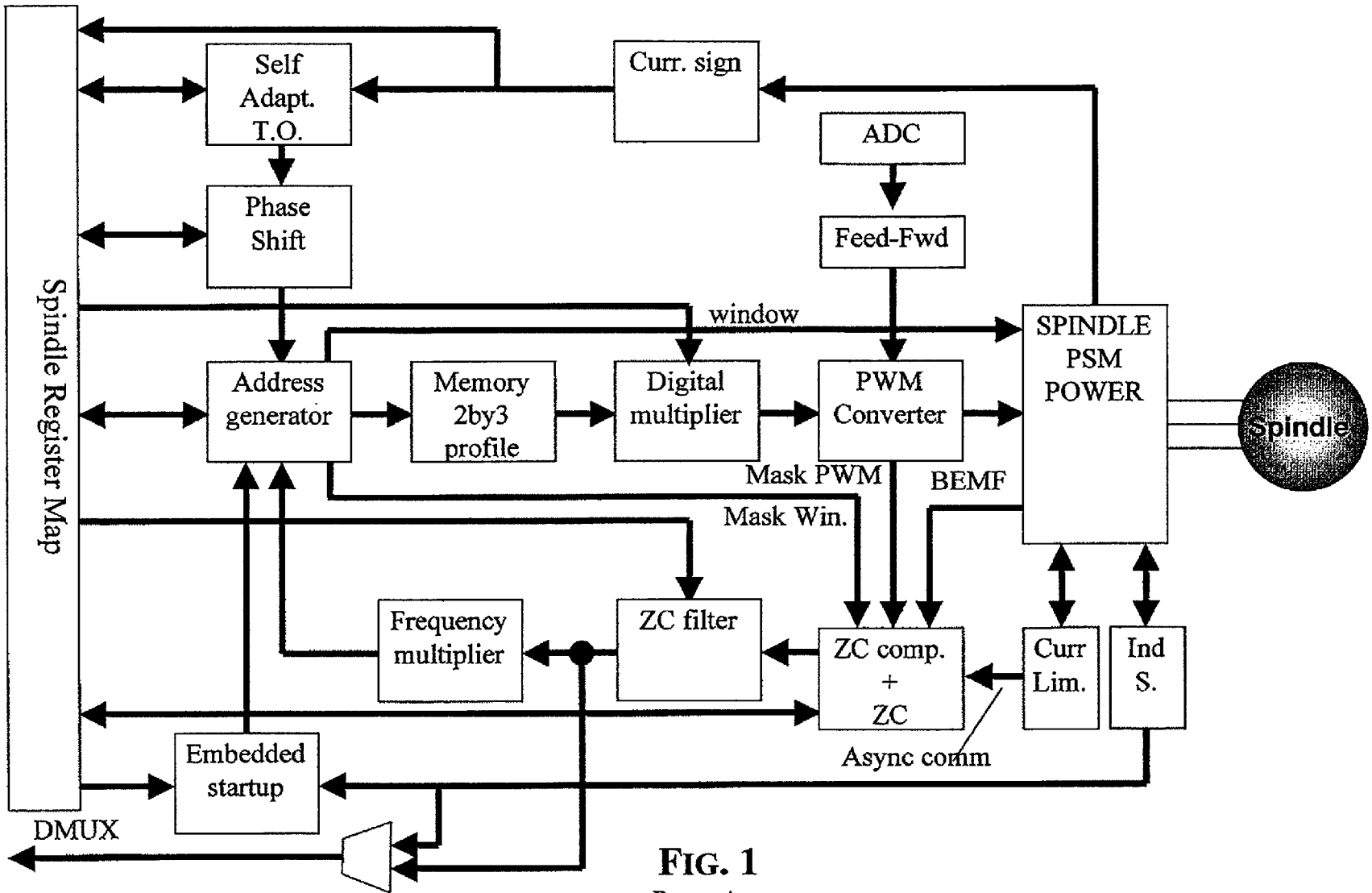
FIG. 1 PRIOR ART
FIG. 1 depicts a control system of a brushless spindle motor of a hard disk drive according to the prior art.
Figure 2:
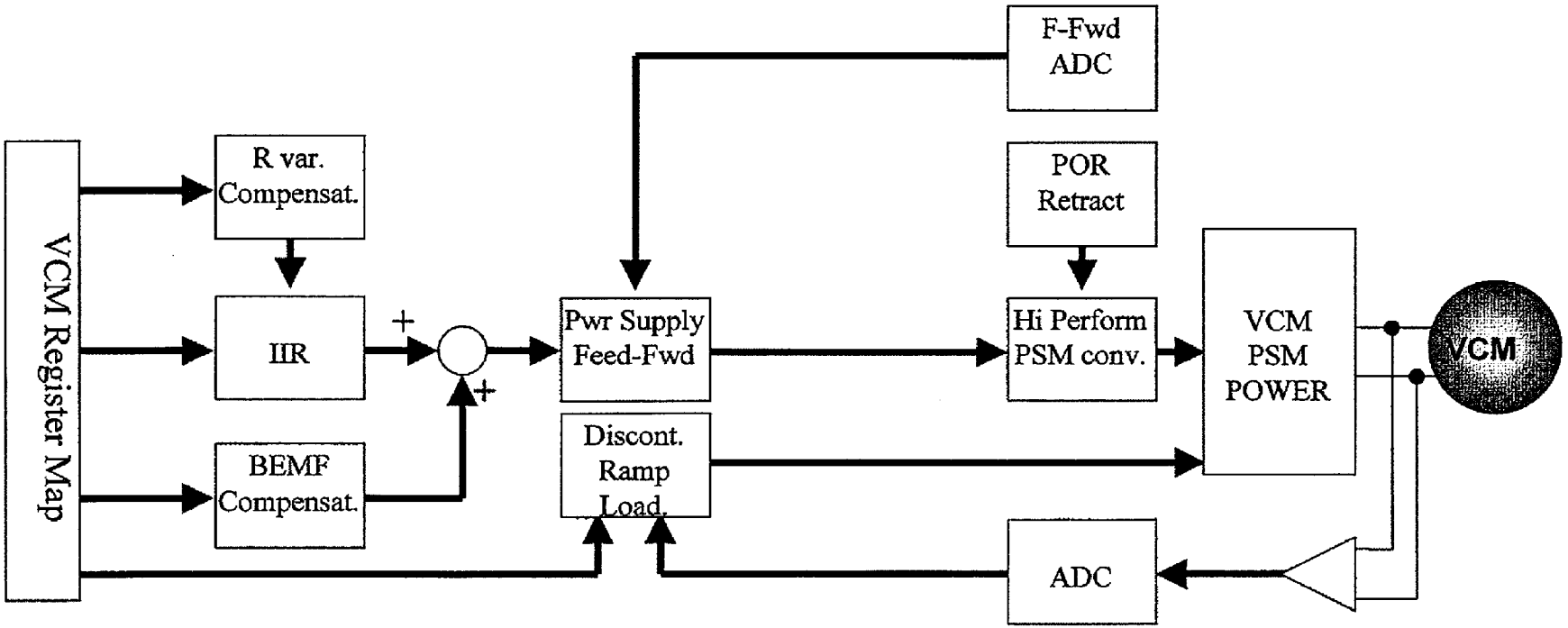
FIG. 2 PRIOR ART
FIG. 2 depicts a known control system of a VCM according to the prior art.
Figure 3:
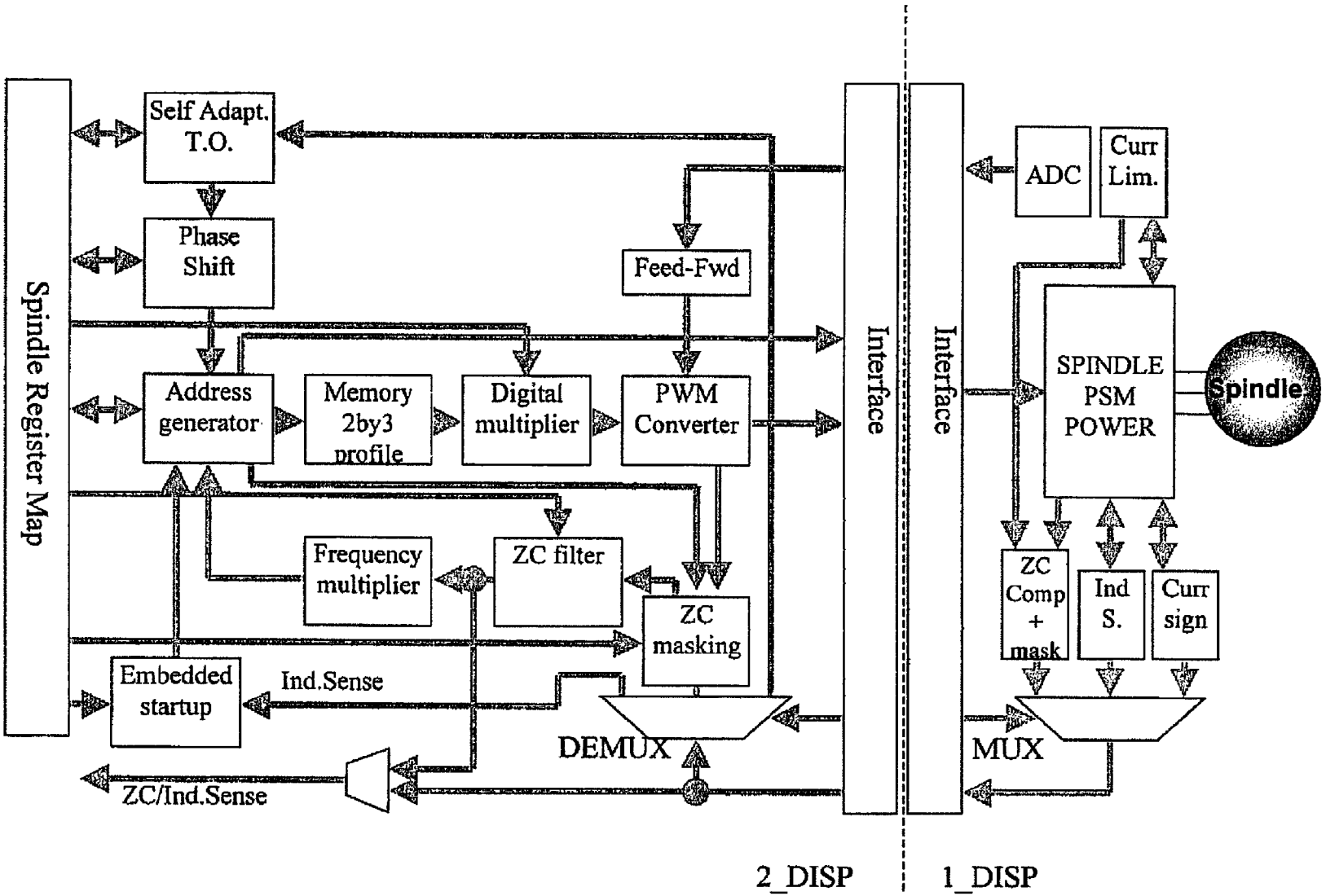
FIG. 3 is a control system of a brushless motor of a hard disk according to the invention.
Figure 4:
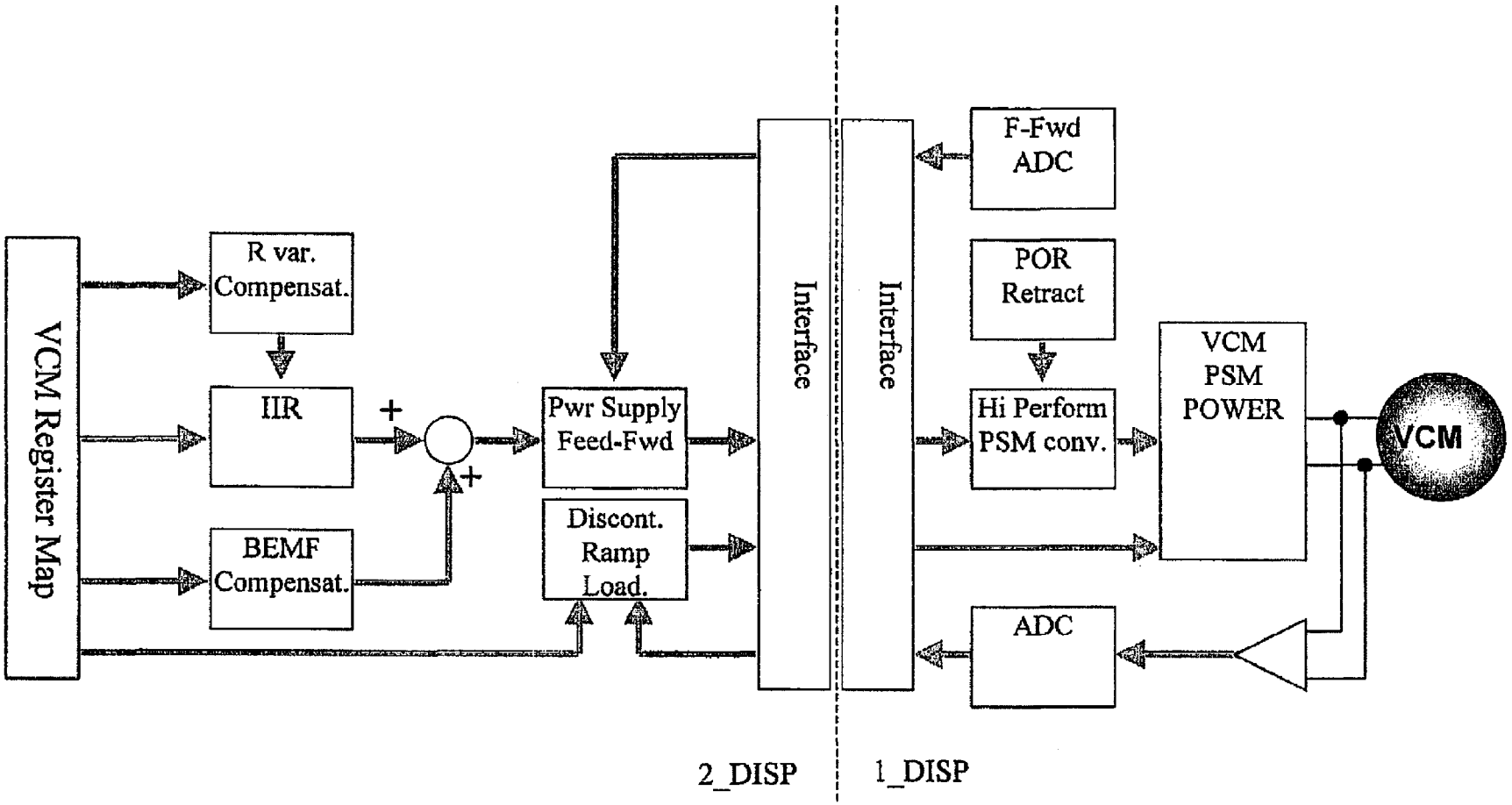
FIG. 4 is a control system of a VCM according to the invention.

FIGS. 3 and 4 show the control system of the invention for the brushless motor that rotates the disk and for the VCM that moves the head carrying arm, respectively. The power stages SPINDLE PSM POWER and VCM PSM POWER of the brushless motor and of the VCM, respectively, are integrated on a first chip 1_DISP distinct from the second chip 2_DISP that contains the control logic circuits of the power stages. The two chips exchange signals that represent the functioning conditions of the controlled motor and digital control signals through dedicated interface circuits INTERFACE.

As stated above, the main advantage of this architecture is that the chips 2_DISP, which integrates all the logic circuits, may be realized with a technology of relatively large integration scale, typically a 0.13 μm minimum line width CMOS technology, while the chip 1_DISP that integrates the output power devices is realized with a common BCD technology, typically with a 0.35 μm minimum line width, for a high power efficiency performance of the output power devices.

Notwithstanding the fact that the invention requires the integration of two additional interfaces, one on every chip, it has been found that the silicon area that is saved by integrating all the logic circuits in a separated integrated device largely exceeds the silicon area required for the integration of the two added interfaces.

The invention claimed is:

1. An integrated control and power driving system for a mass storage disk device comprising a spindle motor for rotating a disk, and a voice-coil motor (VCM) for moving an arm carrying a read/write head over a surface of the disk, the system comprising:

a first chip comprising an interface for receiving digital control signals including three phase modulated digital signals, a spindle motor power stage for driving the spindle motor based on the three phase modulated digital signals, a VCM power stage for driving the voice-coil motor based on the digital control signals, and feedback circuitry coupled to said spindle and VCM power stages for generating feedback signals representing functioning conditions thereof, and providing the feedback signals to said interface; and a second chip comprising an interface for receiving the feedback signals from said first chip, and for providing the digital control signals to said first chip, and a pulse width modulator (PWM) converter for converting digital data into the three phase modulated digital signals for said [VCM] *spindle motor* power stage based, on the feedback signals.

2. The system of claim 1, wherein said second chip further comprises a digital multiplier coupled to said PWM converter for modulating an amplitude of each phase voltage for said spindle motor based on the feedback signals.

3. The system of claim 2, wherein said second chip further comprises a memory coupled to said digital multiplier for storing data sequences used to generate voltage waveforms to be supplied to the phase voltages of the spindle motor during its rotation.

4. The system of claim 3, wherein said second chip further comprises:

a bank of registers for controlling various functions of the spindle motor; and an address generator coupled to said memory and to said bank of registers for generating addresses of the data sequences based on the various functions of the spindle motor.

5. The system of claim 1, wherein said feedback circuitry comprises:

a zero cross circuit for generating a zero-cross signal corresponding to operation of the spindle motor;

an inductance circuit for measuring inductances of phase voltages of the spindle motor; and a current flow circuit for determining a direction of current flow in the spindle motor.

6. The system of claim 1, wherein each interface in said first and second chips comprises a serial interface.

7. The system of claim 1, wherein said first chip is integrated based on bipolar-CMOS-DMOS (BCD) technology, and said second chip is integrated based on CMOS technology.

8. The system of claim 7, wherein said first chip has a 0.35 μm minimum linewidth, and said second chip has a 0.13 μm minimum linewidth.

9. A mass storage disk device comprising:

a spindle motor for rotating a disk;

a voice-coil motor (VCM) for moving an arm carrying a read/write head over a surface of the disk;

an integrated control and power driving system comprising a first chip comprising an interface for receiving digital control signals including three phase modulated digital signals, a spindle motor power stage for driving said spindle motor based on the three phase modulated digital signals, a VCM power stage for driving said voice-coil motor based on the digital control signals, and feedback circuitry coupled to said spindle and VCM power stages for generating feedback signals representing functioning conditions thereof, and providing the feedback signals to said interface; and a second chip comprising an interface for receiving the feedback signals from said first chip, and for providing the digital control signals to said first chip, and a pulse width modulator (PWM) converter for converting digital data into the three phase modulated digital signals for said [VCM] *spindle motor* power stage based on the feedback signals.

10. The device of claim 9, wherein said second chip further comprises a digital multiplier coupled to said PWM converter for modulating an amplitude of each phase voltage for said spindle motor based on the feedback signals.

11. The device of claim 10, wherein said second chip further comprises a memory coupled to said digital multiplier for storing data sequences used to generate voltage waveforms to be supplied to the phase voltages of the spindle motor during its rotation.

12. The device of claim 11, wherein said second chip further comprises:

a bank of registers for controlling various functions of the spindle motor; and an address generator coupled to said memory and to said bank of registers for generating addresses of the data sequences based on the various functions of the spindle motor.

13. The device of claim 9, wherein said feedback circuitry comprises:

a zero cross circuit for generating a zero-cross signal corresponding to operation of said spindle motor;

an inductance circuit for measuring inductances of phase voltages of said spindle motor; and a current flow circuit for determining a direction of current flow in said spindle motor.

14. The device of claim 9, wherein each interface in said first and second chips comprises a serial interface.

15. The device of claim 9, wherein said first chip is integrated based on bipolar-CMOS-DMOS (BCD) technology, and said second chip is integrated based on CMOS technology.

16. The device of claim 15, wherein said first chip has a 0.35 μm minimum linewidth, and said second chip has a 0.13 μm minimum linewidth.

17. A method for operating a mass storage disk device comprising a spindle motor for rotating a disk, a voice-coil motor (VCM) for moving an arm carrying a read/write head over a surface of the disk, and an integrated control and power driving system comprising first and second chips, the method comprising:

receiving digital control signals including three phase modulated digital signals at an interface of the first chip;

driving the spindle motor based on the three phase modulated digital signals with a spindle motor power stage on the first chip;

driving the voice-coil motor based on the digital control signals with a VCM power stage on the first chip;

generating feedback signals representing functioning conditions of the spindle and VCM motors with feedback circuitry coupled to the spindle and VCM power stages on the first chip;

receiving at an interface of the second chip the feedback signals from said first chip, the interface also for providing the digital control signals to said first chip; and converting digital data into the three phase modulated digital signals for the [VCM] *spindle motor* power stage based on the feedback signals.

18. The method of claim 17, wherein the second chip comprises a pulse width modulator (PWM) converter for converting the digital data into the three phase modulated digital signals.

19. The method of claim 18, wherein said second chip further comprises a digital multiplier coupled to the PWM converter for modulating an amplitude of each phase voltage for the spindle motor based on the feedback signals.

20. The method of claim 19, wherein the second chip further comprises a memory coupled to the digital multiplier for storing data sequences used to generate voltage waveforms to be supplied to the phase voltages of the spindle motor during its rotation.

21. The method of claim 20, further comprising:

controlling various functions of the spindle motor with a bank of registers on the second chip; and generating addresses of the data sequences based on the various functions of the spindle motor with an address generator coupled to the memory and to the bank of registers.

22. The method of claim 17, wherein generating the feedback signals comprises:

generating a zero-cross signal corresponding to operation of the spindle motor;

measuring inductances of phase voltages of the spindle motor; and determining a direction of current flow in the spindle motor.

23. The method of claim 17, wherein each interface in the first and second chips comprises a serial interface.

24. The method of claim 17, wherein the first chip is integrated based on bipolar-CMOS-DMOS (BCD) technology, and the second chip is integrated based on CMOS technology.

25. The method of claim 24, wherein the first chip has a 0.35 μm minimum linewidth, and the second chip has a 0.13 μm minimum linewidth.

* * * * *